US009835050B2

(12) United States Patent
Marche (10) Patent No.: US 9,835,050 B2
(45) Date of Patent: Dec. 5, 2017

(54) AIRCRAFT PROPULSION ASSEMBLY COMPRISING AN AIR FLOW VALVE WITH A VARIABLE FLOW RATE

(71) Applicant: Airbus Operations (S.A.S.), Toulouse (FR)

(72) Inventor: Jacques Hervé Marche, Toulouse (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 464 days.

(21) Appl. No.: 14/634,212

(22) Filed: Feb. 27, 2015

(65) Prior Publication Data
US 2015/0292352 A1    Oct. 15, 2015

(30) Foreign Application Priority Data
Apr. 14, 2014    (FR) ..................... 14 53325

(51) Int. Cl.
| F01D 25/12 | (2006.01) |
| F01D 1/02 | (2006.01) |
| F01D 9/02 | (2006.01) |
| F01D 15/02 | (2006.01) |
| F01D 17/00 | (2006.01) |
| B64D 33/08 | (2006.01) |
| F01D 17/14 | (2006.01) |

(Continued)

(52) U.S. Cl.
CPC .......... F01D 25/12 (2013.01); B64D 33/08 (2013.01); F01D 1/02 (2013.01); F01D 9/02 (2013.01);
(Continued)

(58) Field of Classification Search
CPC . F01D 25/12; F01D 25/14; F01D 9/02; F01D 9/065; F01D 15/02; F01D 1/02;
(Continued)

(56) References Cited

U.S. PATENT DOCUMENTS 2,487,842 A * 11/1949 Whiteman ............ F01D 25/20
184/6.11
3,723,021 A * 3/1973 Bartholomew ......... F01D 5/148
415/147

(Continued)

FOREIGN PATENT DOCUMENTS

| EP | 1669551 A2 | 6/2006 |
| FR | 2891313 A1 | 3/2007 |

(Continued)

OTHER PUBLICATIONS

French Search Report for Application No. 1453325 dated Dec. 9, 2014.

Primary Examiner — Craig Kim
Assistant Examiner — Wayne A Lambert
(74) Attorney, Agent, or Firm — Jenkins, Wilson, Taylor & Hunt, P.A.

(57) ABSTRACT

A propulsion assembly having a heat exchanger and a system for supplying cold air including an air inlet in a stream of air, an air duct connecting the air inlet fluidly to the exchanger, and an air flow valve with a variable flow rate inside the duct, the valve including a hub having blades projecting radially from the hub forming a helix, each blade having a root mounted rotatably on the hub, the valve comprising an electric motor to drive the hub by a motor shaft, and structure for varying pitch angle of the blades, the extremity of each blade being flush with a wall of the duct, the valve controllable to a closed configuration where pitch angle of the blades is 0° and the valve prevents passage of air, an open configuration where pitch angle is 90°, and/or a charge configuration where pitch angle is between 0° and 90°.

8 Claims, 11 Drawing Sheets (51) Int. Cl.
*F02K 3/06* (2006.01)
*F02K 3/115* (2006.01)
*F02C 6/08* (2006.01)
*F02C 7/143* (2006.01)
*F02C 7/18* (2006.01)

(52) U.S. Cl.
CPC ............ *F01D 15/02* (2013.01); *F01D 17/00* (2013.01); *F01D 17/148* (2013.01); *F02C 6/08* (2013.01); *F02C 7/143* (2013.01); *F02C 7/185* (2013.01); *F02K 3/06* (2013.01); *F02K 3/115* (2013.01); *F05D 2220/30* (2013.01); *F05D 2260/213* (2013.01); *Y02T 50/675* (2013.01)

(58) Field of Classification Search
CPC ........ F01D 17/00; F01D 17/105; F01D 17/12; F01D 17/14; F01D 17/141; F01D 17/143; F01D 17/145; F01D 17/148; F01D 17/18; F02C 6/08; F02C 7/143; F02C 7/185; F02C 7/18; F02K 3/115; F02K 3/06; F05D 2260/213; F05D 2220/30; B64D 33/08; Y02T 50/675
See application file for complete search history.

(56) References Cited

U.S. PATENT DOCUMENTS

| | | | | |
|---|---|---|---|---|
| 4,239,450 A | * | 12/1980 | Geitner | F04D 29/46 415/160 |
| 4,278,398 A | * | 7/1981 | Hull | F01D 11/001 415/160 |
| 4,393,896 A | * | 7/1983 | Slabaugh | F04B 37/08 137/601.07 |
| 4,441,314 A | * | 4/1984 | Fitton | F01D 11/24 244/129.2 |
| 4,546,605 A | * | 10/1985 | Mortimer | F01D 17/105 184/6.11 |
| 4,608,819 A | * | 9/1986 | Colman | F01D 17/02 361/690 |
| 5,269,649 A | * | 12/1993 | Kiefer | F04D 29/466 415/148 |
| 6,282,881 B1 | * | 9/2001 | Beutin | B64D 33/10 184/6.11 |
| 6,651,929 B2 | * | 11/2003 | Dionne | B64D 33/08 165/44 |
| 7,810,312 B2 | * | 10/2010 | Stretton | F02C 7/141 60/226.1 |
| 9,200,640 B2 | * | 12/2015 | Patil | F04D 27/0246 |
| 9,624,831 B2 | * | 4/2017 | Brousseau | F02C 7/00 |
| 2006/0117734 A1 | * | 6/2006 | Larkin | F01D 25/12 60/226.1 |
| 2008/0230651 A1 | * | 9/2008 | Porte | B64D 13/06 244/118.5 |

FOREIGN PATENT DOCUMENTS

| | | |
|---|---|---|
| FR | 2955896 A1 | 8/2011 |
| WO | WO-2012/125895 A1 | 9/2012 |
| WO | WO-2014/051678 A1 | 4/2014 |

* cited by examiner

AIRCRAFT PROPULSION ASSEMBLY COMPRISING AN AIR FLOW VALVE WITH A VARIABLE FLOW RATE

CROSS-REFERENCE TO RELATED APPLICATION

This application claims the benefit of and priority to French patent application No. 14 53325 filed on Apr. 14, 2014, the entire disclosure of which is incorporated by reference herein.

BACKGROUND

The disclosure herein relates to an aircraft propulsion assembly comprising a turbofan engine having an air flow valve with a variable flow rate intended to supply air to a heat exchanger.

In a manner known per se, an aircraft propulsion assembly comprises a bleed air system in the area of the turbomachine engine in order to provide a supply of air to the systems which use air, for example such as the cabin air exchange and pressure regulation system.

In order to ensure that the temperature of the air at the exit from the bleed air system remains within the acceptable limits for the user systems, the bleed air system comprises a heat exchanger (PCE for precooler:cooler) allowing the hot air that is bled at the engine to be cooled thanks to the cold air that is bled in the secondary stream of air of the turbomachine. The cold air is bled by a system for the supply of cold air comprising an air inlet arranged in the secondary stream of air, a duct connecting the air inlet to the exchanger, and an air flow valve with a variable flow rate of the butterfly type. The butterfly or movable flap is positioned inside the duct and provides the possibility, by its rotation, for adjusting the rate of flow of the system for the supply of air depending on the requirements of the user systems.

It will be appreciated that such a system for the supply of air does not provide the exchanger with a rate of flow of cold air sufficient to enable the latter to cool the air that is bled at the engine in the case of a propulsion assembly having a turbomachine with a high dilution ratio.

A suitable solution for such propulsion assemblies would be to increase the exchange surface of the exchanger and the dimensions of the air inlet and of the duct. This solution is not viable, however, since the space available for the arrangement of elements inside a propulsion assembly is very limited. The need accordingly exists for a system for the supply of cold air that is more efficient while retaining substantially the same dimensions as the current systems.

SUMMARY

One of the objects of the present disclosure is to overcome the above-mentioned disadvantage in full or in part. For this purpose, the disclosure herein relates to a propulsion assembly comprising a turbomachine and a pylon, the turbomachine comprising an engine attached to the pylon, an annular interstream shroud surrounding the engine and an annular nacelle disposed coaxially around and radially towards the exterior in relation to the interstream shroud, in such a way as to delimit together with the latter a stream of air, the turbomachine comprising a heat exchanger and a system for the supply of cold air, the system comprising an air inlet placed in the stream of air, an air duct connecting the air inlet fluidly to the exchanger, and an air flow valve with a variable flow rate placed inside the duct, the valve comprising a hub, on which there are mounted at least three blades projecting radially from the hub in order to form a helix, each blade having a root mounted rotatably on the hub, the valve in addition comprising an electric motor configured to drive the hub by a motor shaft, and structure for varying the pitch angle of the blades, the extremity of each blade being flush with a wall of the duct, the valve being controllable to adopt one of the following configurations:

a configuration known as a closed configuration, in which the pitch angle of the blades is 0° and in which the valve prevents the passage of the air through the duct;

a configuration known as an open configuration, in which the pitch angle of the blades is 90° and in which the valve completely opens the access to the air duct;

a configuration known as a charge configuration, in which the pitch angle of the blades lies in the range between 0° and 90°.

A principal advantage of the disclosure herein in relation to the existing systems for the supply of cold air consists of the air flow valve according to the disclosure herein allowing a charge configuration in addition. This configuration makes it possible to respond to the requirements for cold air of the user systems when the temperatures reached inside the engine are high. The system for the supply of air according to the disclosure herein is thus suitable for an application in turbomachines with a high dilution ratio.

BRIEF DESCRIPTION OF THE DRAWINGS

The characterizing features of the disclosure herein mentioned above, as well as others, will be appreciated more clearly from a perusal of the following description of illustrative embodiments, the description being given in relation to the accompanying drawings, in which.

DETAILED DESCRIPTION

Figure 1:
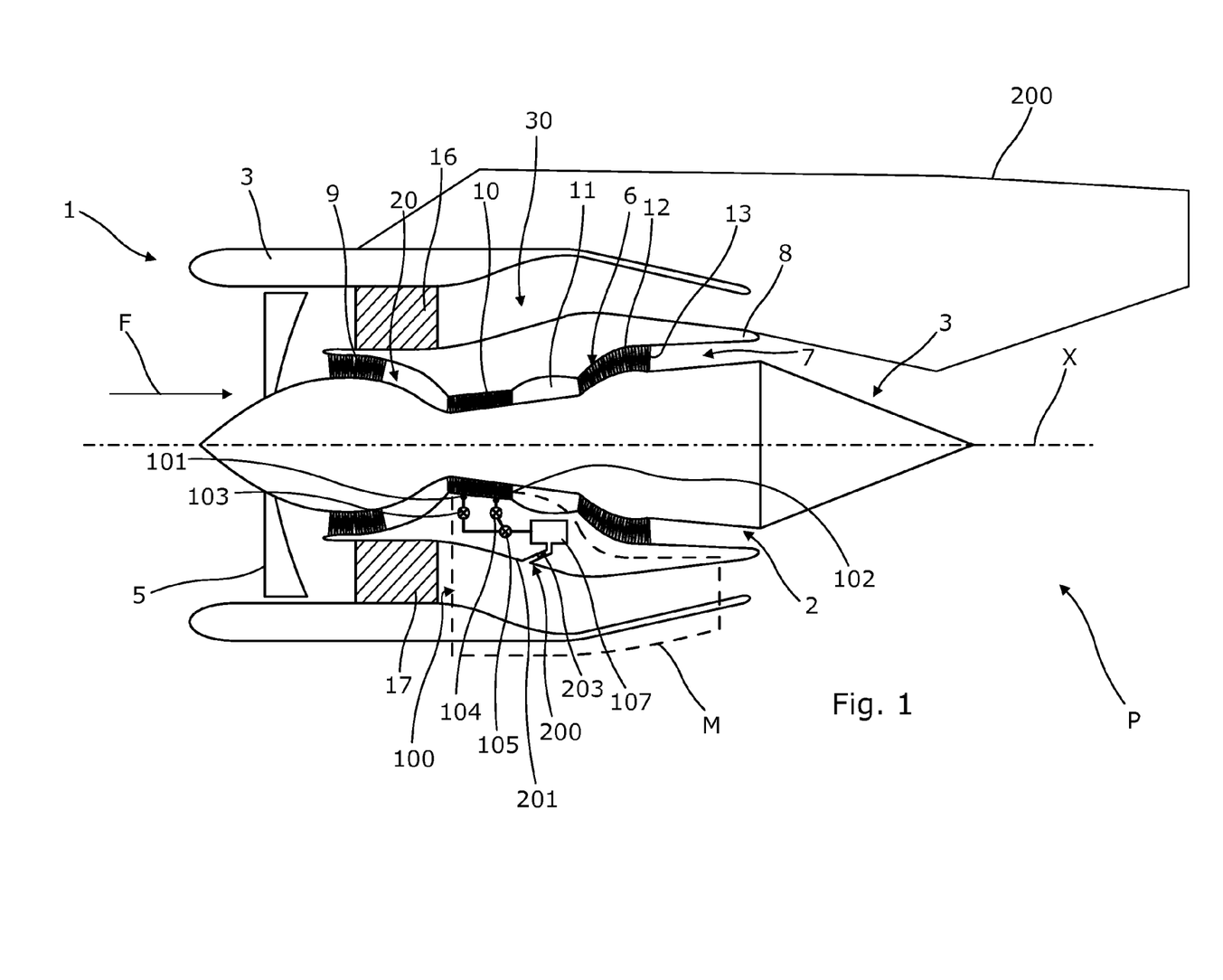
FIG. 1 is a schematic view, according to a first architecture, of a propulsion assembly according to the disclosure herein viewed in section in its longitudinal axis, the assembly comprising a system for the supply of cold air.

With reference to FIG. 1, a propulsion assembly P comprises a turbofan engine 1 and its system of attachment, or pylon 200, to a wing of the aircraft (not depicted here).

The turbomachine comprises an annular nacelle 3, centered on a longitudinal axis X, and an engine 2 surrounded by the nacelle 3 and secured to the pylon. The engine 2 is secured to the nacelle 3 by two diametrically opposed bifurcations 16, 17 which make it possible to ensure the mechanical cohesion of the turbomachine 1.

In the direction of flow of an air flow passing through the turbomachine 1 and indicated by the arrow F in FIG. 1, the engine 2 comprises, centered on the longitudinal axis X, a fan 5, a motor casing 6 and a nozzle 7.

The motor casing 6 comprises elements permitting the fan 5 to be caused to rotate when the engine 2 is set in motion. These elements are, in the direction indicated by the arrow F, a low-pressure compressor 9, a high-pressure compressor 10, a combustion chamber 11, a high-pressure turbine 12 and a low-pressure turbine 13.

The turbomachine 1 comprises in addition, downstream of the fan 5, an annular interstream shroud 8 that is concentric with the motor casing 6 and, together with the latter, delimits an annular airflow path, known as the primary flow path 20.

The nacelle 3 constitutes the external envelope of the turbomachine 1 and surrounds the interstream shroud 8, with which it is concentric. The nacelle 3 thus delimits, together with the interstream shroud 8, an annular flow path, known as the secondary flow path 30. The flow paths 20 and 30 extend as far as a point downstream of the low-pressure turbine 13, that is to say in the area of the nozzle 7.

Figure 2:
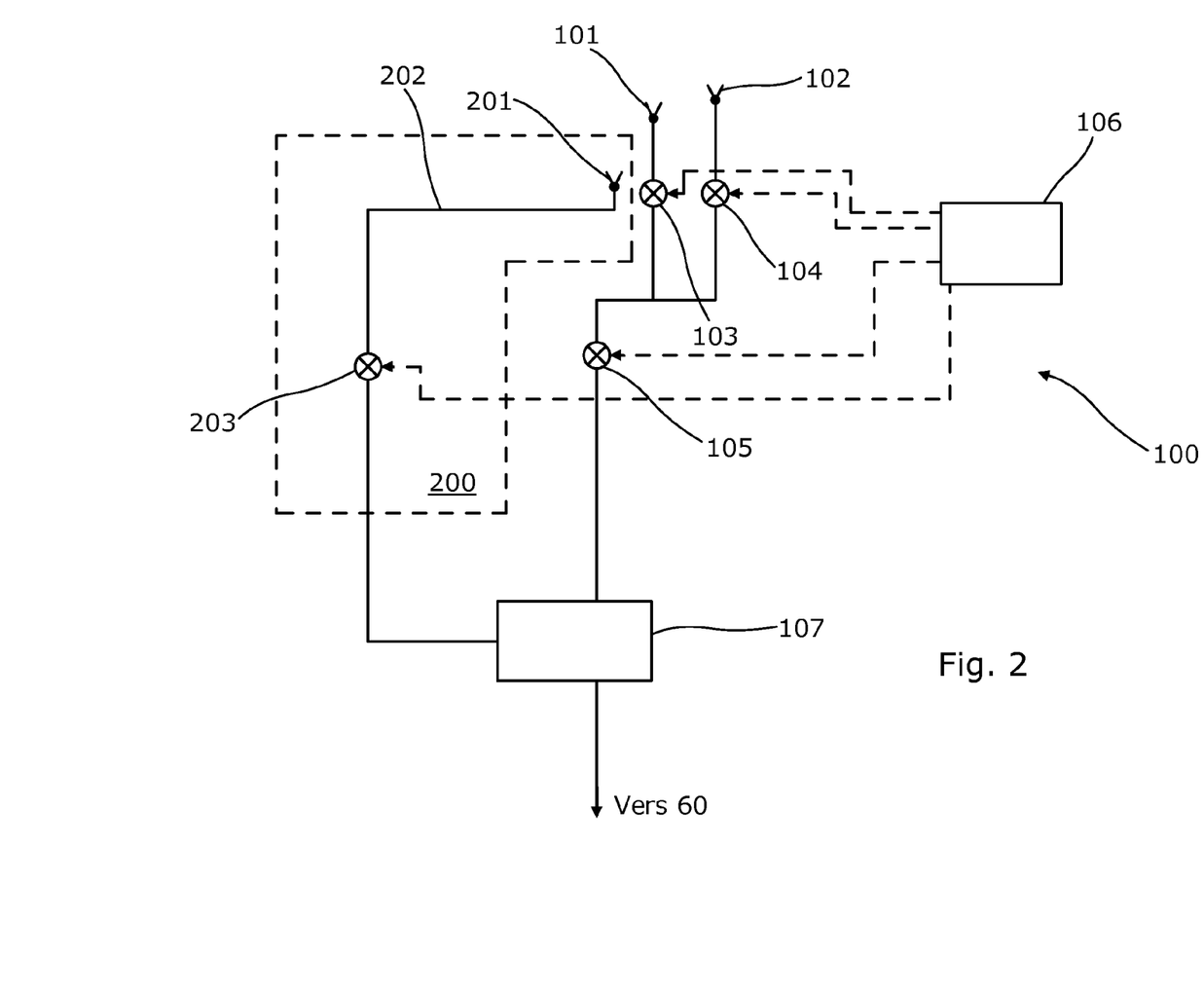
FIG. 2 is a schematic view depicting the arrangement of a bleed air system comprising the system for the supply of air in FIG. 1.
Figure 3:
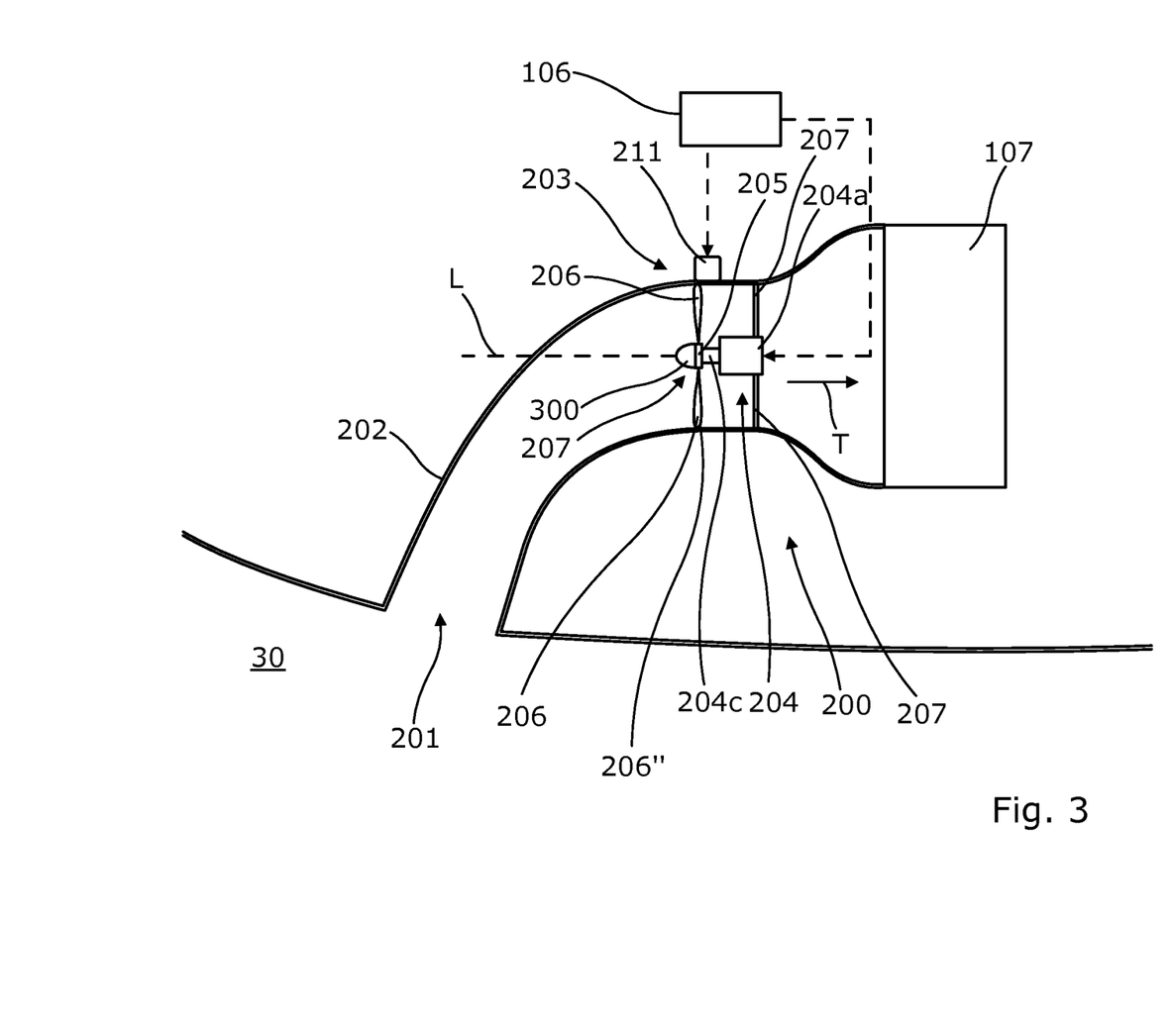
FIG. 3 is an enlarged view of zone M in FIG. 1 and depicts the system for the supply of air according to one embodiment of the disclosure herein.
Figure 4:
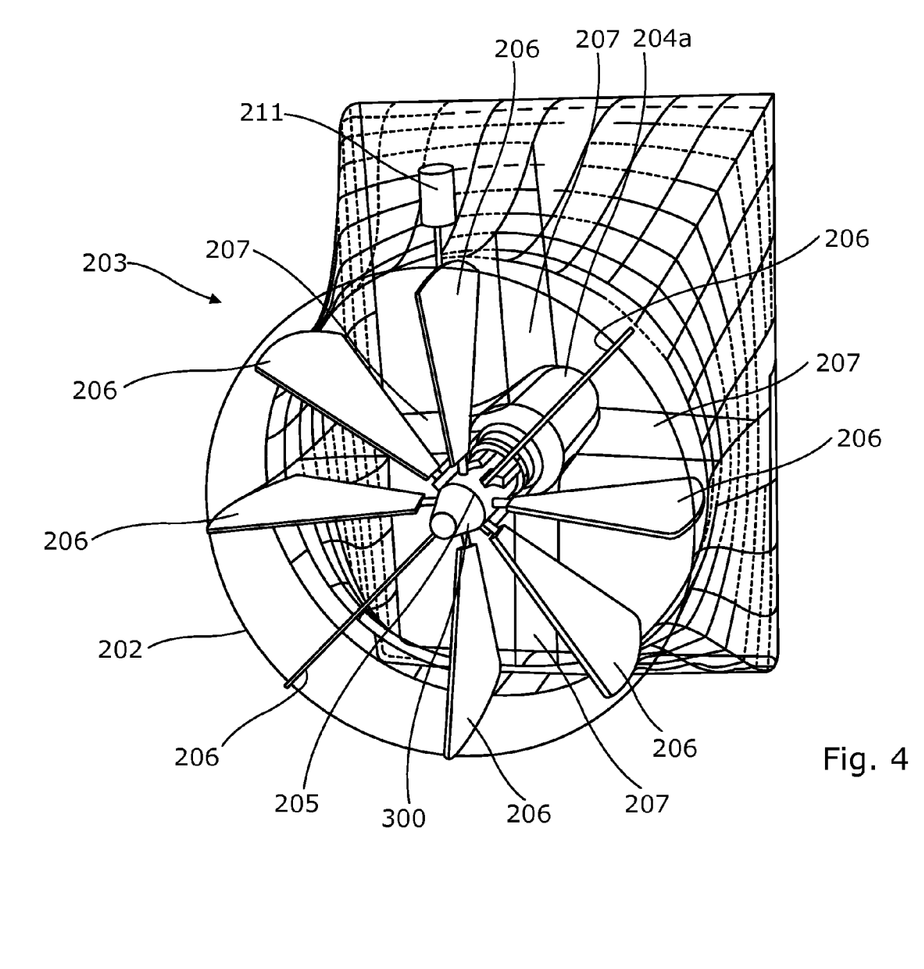
FIG. 4 is a schematic view of an air flow valve with a variable flow rate equipping the system for the supply of air in FIG. 3.

With reference to FIGS. 1 and 2, the propulsion assembly P comprises, in a manner known per se, a system 100 for bleeding air in the area of the engine 6 of the turbomachine intended for the purpose of supplying air to one or a plurality of systems 60 which use air.

The system for bleeding air 100 comprises the following, for example arranged in the thickness of the interstream shroud 8:
- a first air intake 101 intended to bleed, in the high-pressure compressor, air at intermediate pressure;
- a second air intake 102 intended to bleed, in the high-pressure compressor 18, air at high pressure;
- a non-return valve 103 connected fluidly to the first air inlet, and which prevents the air from traveling towards the first air inlet 101;
- a high-pressure valve 104 connected fluidly to the second air inlet 102 and controlled alternately for opening or for closing;
- a regulating valve 105 intended to regulate the pressure of the flow of air which passes through it, the outlet from the high-pressure valve and the outlet from the non-return valve being connected fluidly to the same inlet of the regulating valve 105;
- an exchanger 107 intended to cool the air which passes through it. The outlet from the regulating valve 105 is connected fluidly to an inlet to the exchanger 107 and an outlet from the exchanger 107 is connected fluidly to at least one system 60 which consumes air;
- a system for the supply of cold air 200 intended to supply cold air to the exchanger 107, and
- a controller 106 depicted in FIG. 2, of the central processing unit type, intended to control the degree of opening of the valves in the system for bleeding and controlling the flow of air supplied by the system for the supply of cold air 200.

The system for the supply of cold air 200 comprises an air inlet 201 arranged downstream of the fan 5 in the secondary flow path 30, an air duct 202 connecting the exchanger 107 to the air inlet 201, and a valve 203 with a variable flow rate arranged in the air duct 109.

According to the disclosure herein, and with reference to FIGS. 3 to 8, the valve 203 with a variable flow rate comprises an electric motor 204, a hub 205 that is caused to rotate by the motor and is equipped with a plurality of blades 206 projecting radially from the hub in order to form a helix, as well as structure for varying the pitch angle of the blades 207. The electric motor 204 as well as the structure for varying the pitch angle of the blades 207 are controlled by the controller 106. In the example illustrated in FIGS. 3 to 8, the hub 205 is situated upstream in the direction of flow of a flow of air passing through the valve towards the exchanger and indicated by the arrow T in the figures, while the motor 204 is situated downstream in the direction T.

The motor 204 comprises a motor casing 204a, a frame 204b and an essentially cylindrical motor shaft 204c coupled to the hub 205. The frame is dimensioned in such a way that the motor shaft 204c is situated at the center of a section of the duct 202 with its longitudinal axis, or the axis of rotation L of the motor shaft, being substantially parallel to the direction of flow of a flow of air passing through the valve towards the exchanger T. The frame 204b is formed, for example, by four individually perpendicular arms, each of the arms being secured both to the wall of the duct 202 and to the motor casing 204a.

The hub 205 is secured to the extremity of the motor shaft 204c and comprises at least three blades 206 extending radially from the external envelope of the hub 205. In the example illustrated in FIGS. 4 to 8, the hub 205 comprises 8 blades.

Each blade 206 is profiled and has a root 206' secured to the hub 205. In addition, the extremity (blade tip) 206" of each blade is flush with the wall of the duct 202. According to the disclosure herein, the root 206' of each blade is rotatably mounted on the hub 205 so that the pitch angle of the blades may be modified by the structure for varying the pitch angle of the blades 207. In a manner known per se, the expression pitch angle of a blade is used to denote the angle formed between the reference chord of the profile of a blade and the plane of rotation of the helix, the plane of rotation of the helix being perpendicular to the axis of rotation L of the motor shaft.

It should be noted that the hub 205 is arranged on motor shaft 204c of the motor so that the leading edge of the blades is situated upstream in the direction of flow of the flow of air passing through the duct T.

Figure 5:
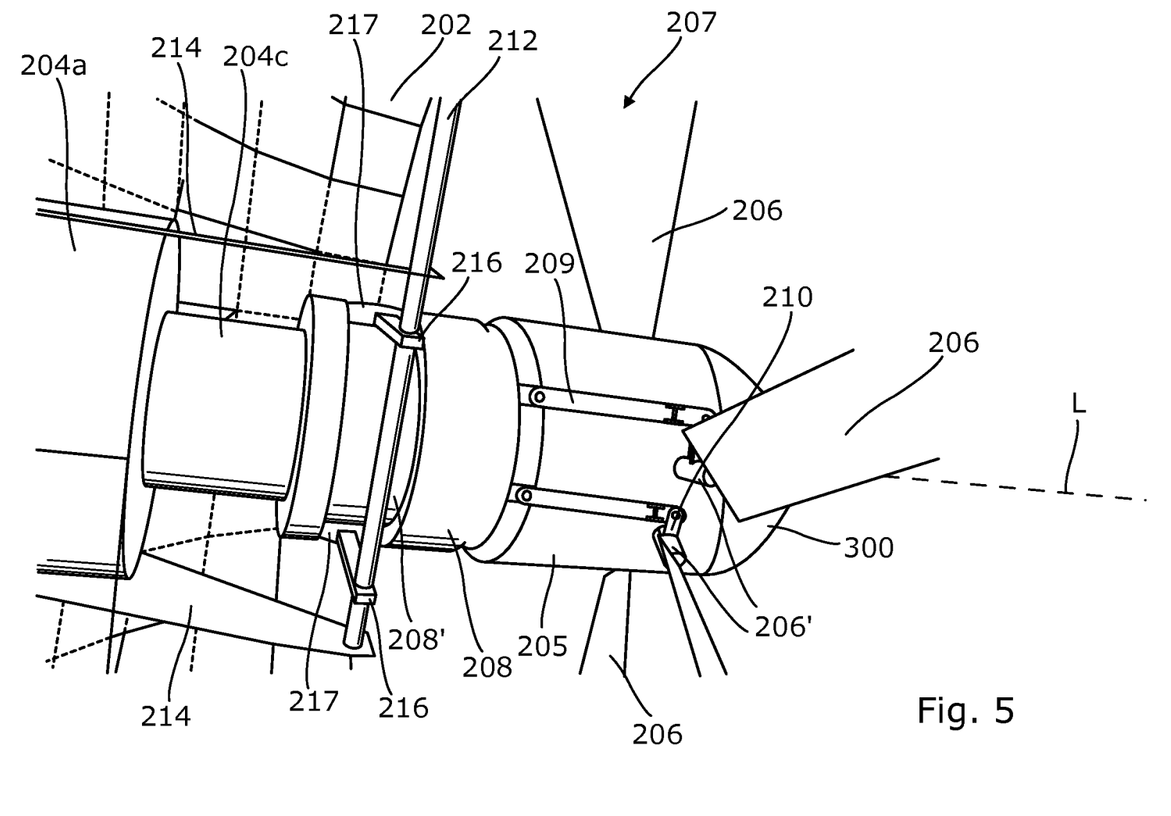
FIG. 5 is a schematic view of the structure for varying of the pitch angle of the blades of the air flow valve with a variable flow rate illustrated in FIG. 4.

The structure for varying the pitch angle of the blades 207 illustrated in FIG. 5 comprises a ring 208, eight transmission rods 209 associated with eight levers 210, each of which is coupled to a blade 206, a servomotor 211 (not visible in FIG. 5) and an actuating lever 212 attached to the servomotor 211.

The ring 208 is mounted on the motor shaft 204c between the motor casing 204a and the hub 205. The ring 208 comprises a throat 208' realized on its external diameter and comprises grooves arranged on its internal diameter (not depicted here). These grooves interact with grooves made on the motor shaft 204c of the motor 204 so that the ring 208 is integral in rotation with the motor shaft 204c but is also capable of displacement in translation on the latter in the axis of rotation L of the motor shaft.

The servomotor 211 is configured, when it is actuated, in order to cause a substantially cylindrical motor shaft 213 to rotate. The servomotor 211 is situated advantageously outside the duct 202 in order not to disrupt the flow of the fluids at that point.

The actuating lever 212 is situated in the prolongation of the motor shaft 213 of the servomotor 211 and is supported by two support arms 214 that are spaced apart from one another and are each attached to the motor casing 204b. Each support arm 214 comprises a transcurrent hole, which is aligned with the transcurrent hole of the other support and which has an axis perpendicular to the axis of rotation L of the motor shaft. The actuating lever 212 is introduced into the hole of each of the supports 214 and is thus capable of rotation on an axis perpendicular to the axis of rotation L of the motor shaft.

Furthermore, the actuating lever 212 comprises two actuating arms 216 that are spaced apart from one another by a distance that is substantially equal to the external diameter of the ring 208. Each of the actuating arms 216 comprises at its free extremity a roller 217 that is capable of rotation and is inserted into the throat 208' of the ring 208, in which it is able to roll.

Each lever 210 is attached to the root 206' of a blade 206. Each transmission rod 209 is disposed substantially parallel to the axis of rotation L and is attached at a first extremity to a lever 210 via a pivoting linkage having a pivoting axis perpendicular to the axis of rotation L, and at a second extremity to the ring 208 via a pivoting linkage likewise having a pivoting axis perpendicular to the axis of rotation L of the motor shaft.

Figure 6:
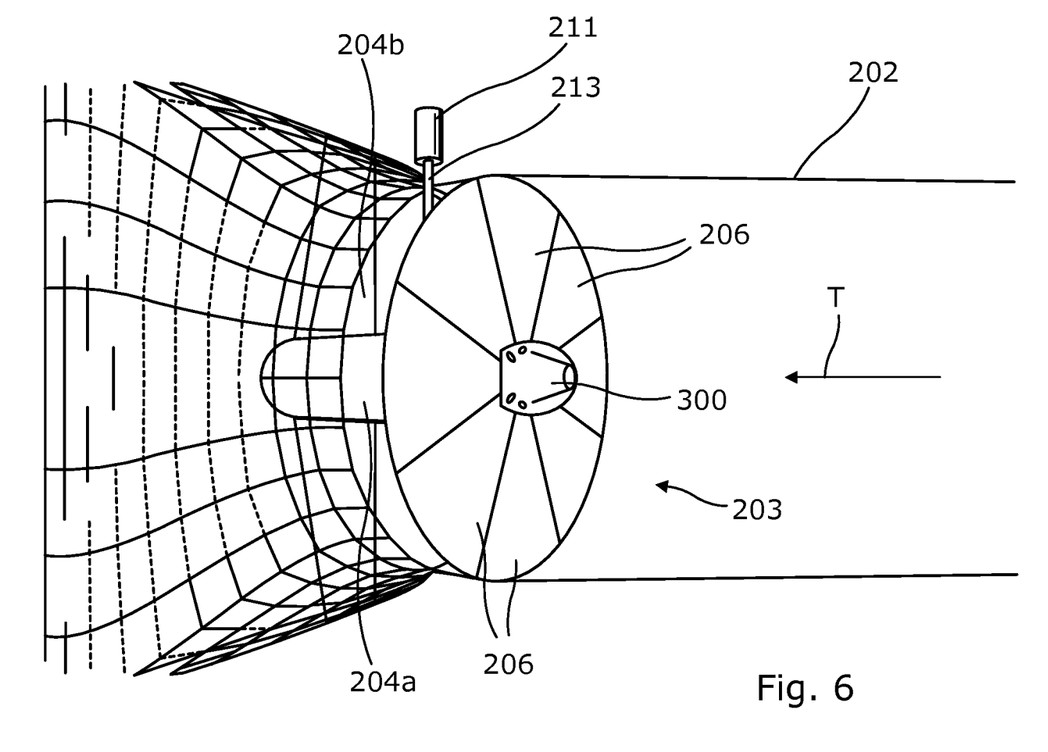
FIGS. 6 to 8 are schematic views in perspective depicting the air flow valve with a variable flow rate of the system for the supply of air in FIG. 4 at different angles of pitch of the blades.
Figure 7:
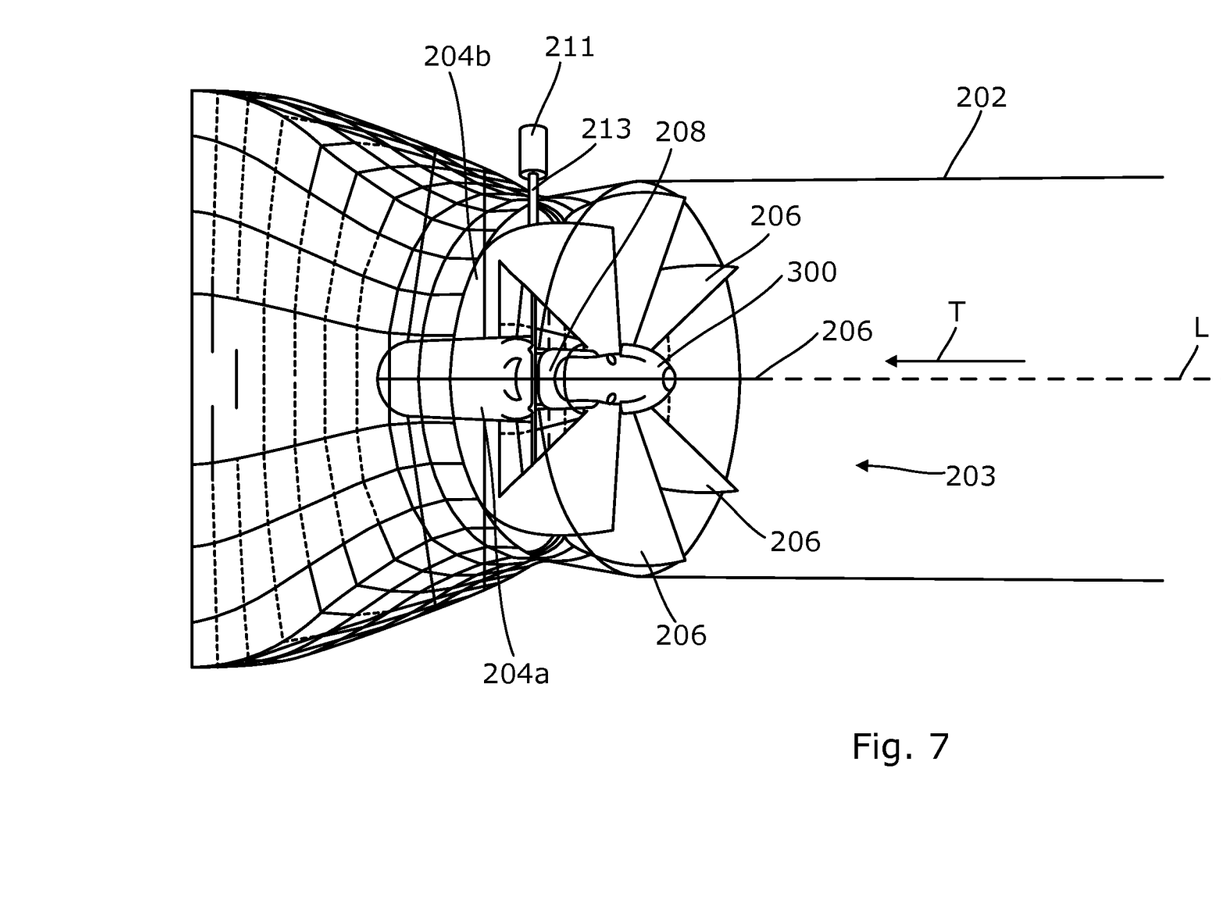
Figure 8:
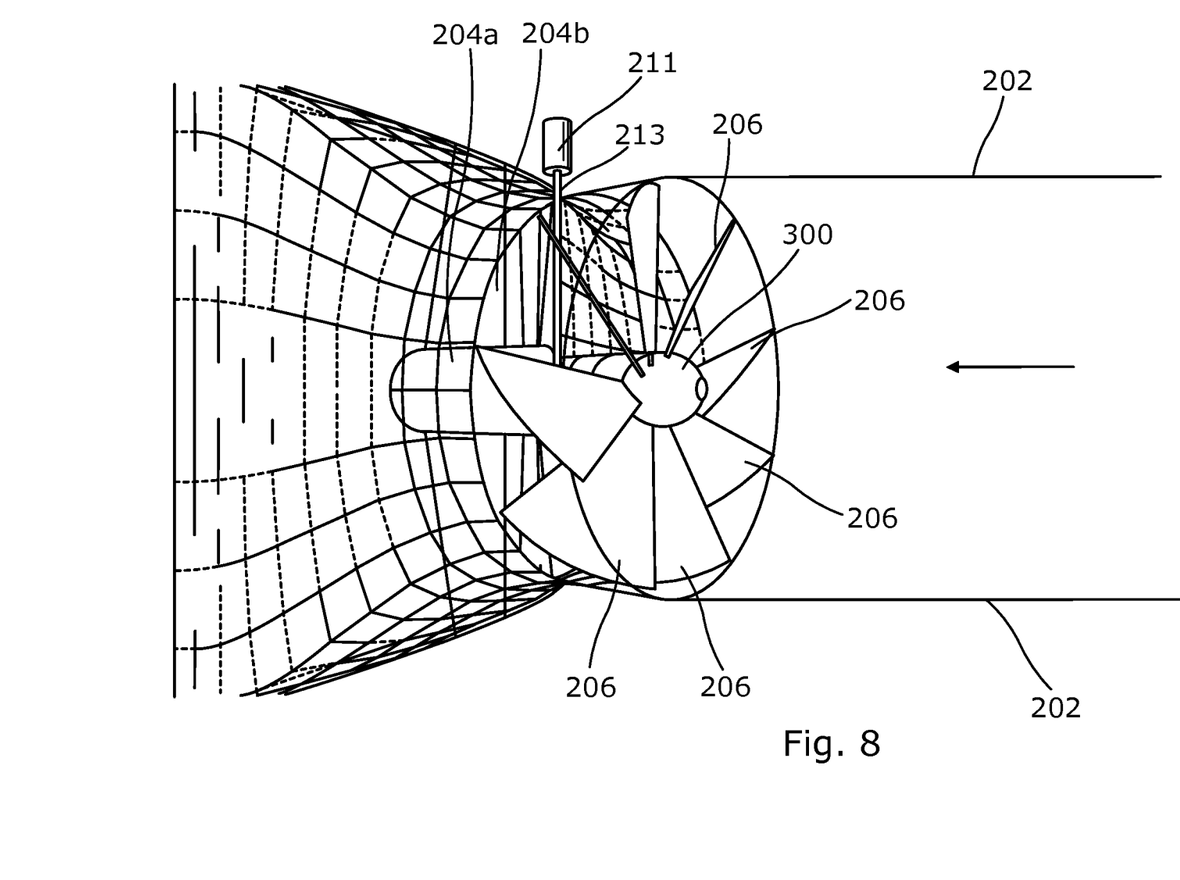

The structure or apparatus for varying the pitch angle of the blades 207 operates according to the following principle: rotation of the motor shaft 213 of the servomotor causes rotation of the actuating lever 212 and thus of the two actuating arms 216. The rotation of the actuating arms brings about, via the rollers 217 inserted into the throat 208', a displacement of the ring 208, which is constrained in translation, on the motor shaft 204c. The displacement of the ring 208 causes the displacement of the transmission rods 209 and thus, by the levers 210, causes rotation of the root 206' of the blades about their chord line. According to this principle, the pitch angle of the blades 206 varies between two extreme angles:

an angle of 0°, at which the blades 206 close the duct 202 in a practically sealed manner, as depicted in FIG. 6; and an angle of 90°, which corresponds to a feathering of the blades 206, as depicted in FIG. 7, completely opening the access to the duct.

Thus, for pitch angles other than 0° and 90°, and for an appropriate direction of rotation of the motor shaft, the rotation of the hub 205 conveys cold air to the exchanger 107.

When the turbomachine 1 is set in motion, the operation of the system for the supply of cold air 200, as described above, is as follows: the air is admitted into the turbomachine 1 via the fan 5. Downstream of the fan 5, the flow of air divides into one part which flows in the secondary flow path 30 and another part which utilizes the primary flow path 20. In the secondary flow path 30, and as a result of the dynamic pressure of the flows of air, one part of the air enters the system for the supply of cold air 200 in the area of its air inlet 201 (arrow E).

Depending on a flow of air required by a user system 60, the controller 106 modifies the speed of rotation of the motor 204 and/or the pitch angle of the blades 206 in order to adapt the flow of air provided by the system for the supply of cold air 200. The following configurations are possible:

the closed configuration, depicted in FIG. 6, in which the pitch angle of the blades 206 is 0°, and where the motor 204 has not been set in motion. In this configuration, no fluid is bled through the air inlet 201 because the valve 203 then prevents the air from circulating from the air inlet 201 towards the exchanger 107. In this configuration, the drag induced by the system for the supply of cold air is minimal;

the open configuration, depicted in FIG. 7, where the blades 206 are feathered, and where the motor 204 has not been set in motion. In this configuration, fluid is bled via the air inlet 201 and is conveyed towards the exchanger 107 via the duct 202. Such a configuration is appropriate for the majority of normal operating modes of the turbomachine 1; and a charged configuration, depicted in FIG. 8, where the motor 204 is set in motion and causes the hub 205 to rotate, and where the blades 206 have a pitch angle in the range between 0° and 90°, preferably between 35° and 50°. The speed of rotation of the motor is regulated by the controller 116 in order that the temperature at the exit from the exchanger 107 (temperature of the flow of air received by the user systems) is equal to a setpoint temperature. In this configuration, the air flow valve with a variable flow rate 203 acts as a fan which increases the mass of air bled at the air inlet 201 in order to convey it to the exchanger 107. In this configuration, the flow of air supplied by the valve 203 is increased or reduced respectively by increasing or reducing the speed of rotation of the motor 204. Such a configuration is adopted in order to perform maximum bleeding of cold air in extreme cases where the temperature reached inside the engine is very high. It should be noted that it is in this configuration that the drag induced by the system for the supply of cold air 200 according to the disclosure herein is at its maximum value.

By way of example, and for systems for the supply of cold air having the same dimensions (air inlet, duct with a diameter of 270 mm), the air flow valve 203 according to the disclosure herein provides a maximum flow rate of 100 g/s, whereas this flow rate is only 70 g/s for an air flow valve according to the prior art.

An advantage of the disclosure herein in relation to the existing systems for the supply of cold air is that the air flow valve 203 also permits a charge configuration while retaining dimensions that are substantially identical to the dimensions of the valves of the prior art. This configuration makes it possible to respond to the requirements for cold air of the user systems 60 when the temperatures reached inside the engine 2 are high. The system for the supply of cold air 200 according to the disclosure herein is thus suitable for an application in turbomachines 1 with a high dilution ratio.

As a variant of the embodiment described above, and in relation to FIG. 9, the hub 205 is situated downstream in the direction of flow of a flow of air passing through the duct T, while the motor 204 is situated upstream in the direction T. The hub 205 is arranged on the motor shaft 204c of the motor, so that the leading edge of the blades is situated upstream in the direction of flow of the flow of air passing through the duct T. Thus, for pitch angles other than 0° and 90°, and for an appropriate direction of rotation of the motor shaft, the rotation of the hub 205 conveys cold air to the exchanger 107.

The system for the supply of cold air 200 may be arranged in a turbomachine assembly P regardless of its architecture.

Figure 10:
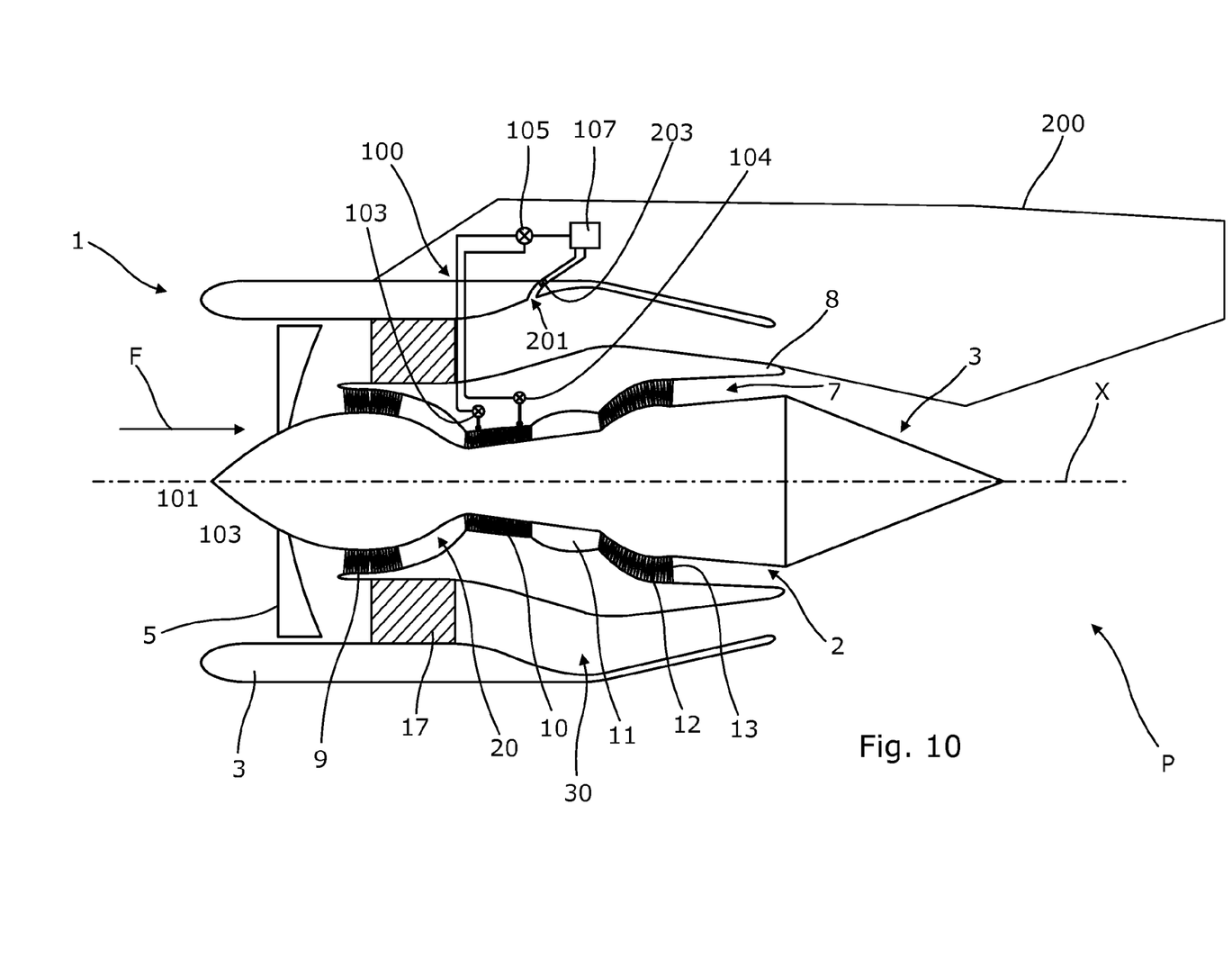
FIGS. 10 and 11 are views similar to FIG. 1 and depict different architectures of a propulsion assembly according to the disclosure herein.

Thus, in a first architecture illustrated in FIG. 10, the exchanger 107 is arranged inside the engine pylon 200, the air duct 202 in this case being arranged in part inside the space situated between the nacelle 3 and the engine pylon 200, while the air inlet is situated on the external wall of the secondary flow path 30.

Figure 11:
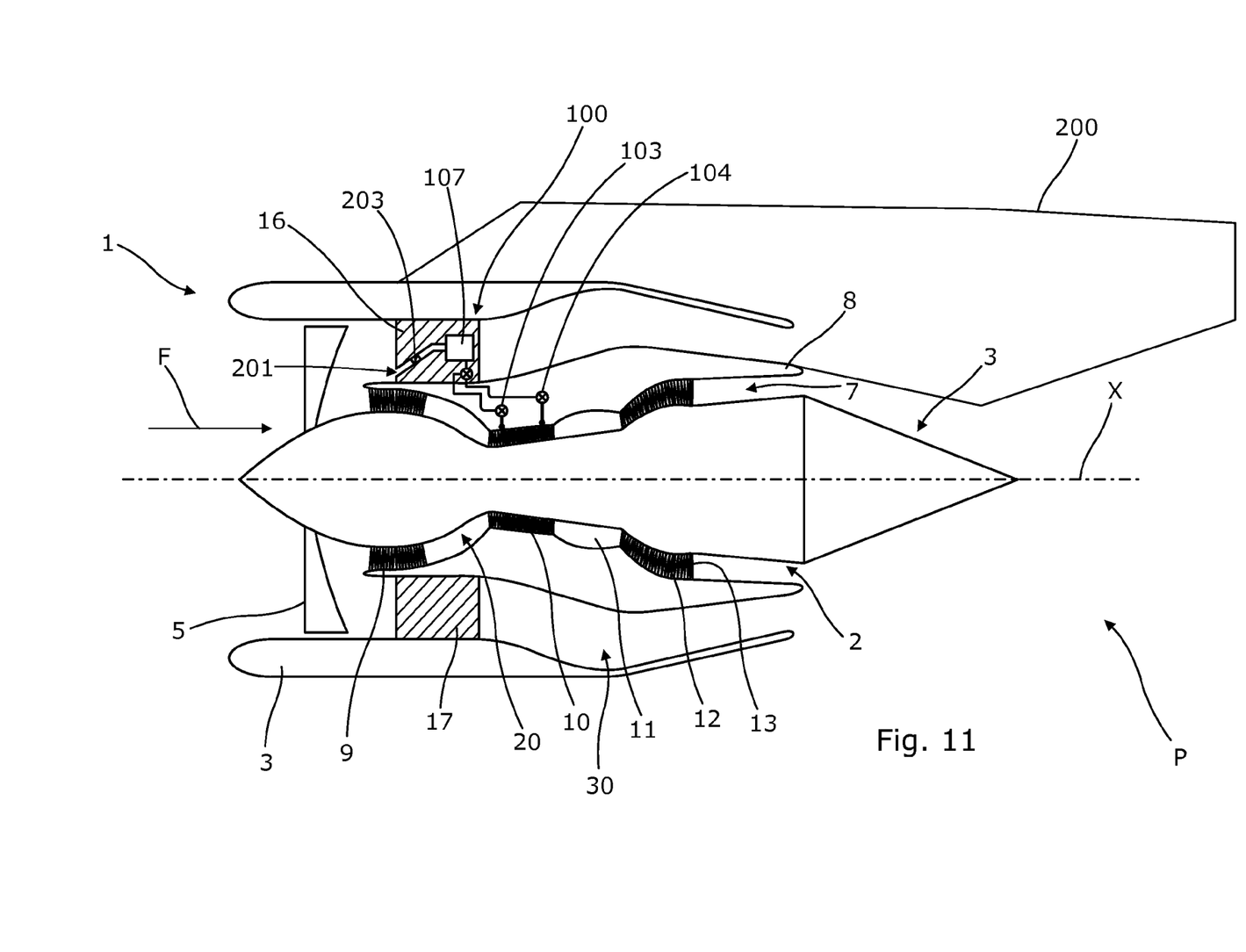

In a second architecture illustrated in FIG. 11, the exchanger 107 is arranged in a bifurcation 16, the air duct 202 in this case being arranged in part inside the thickness of the bifurcation 16, while the air inlet is situated on the external wall of the bifurcation 16 in order to bleed air from the secondary flow path 30.

Figure 9:
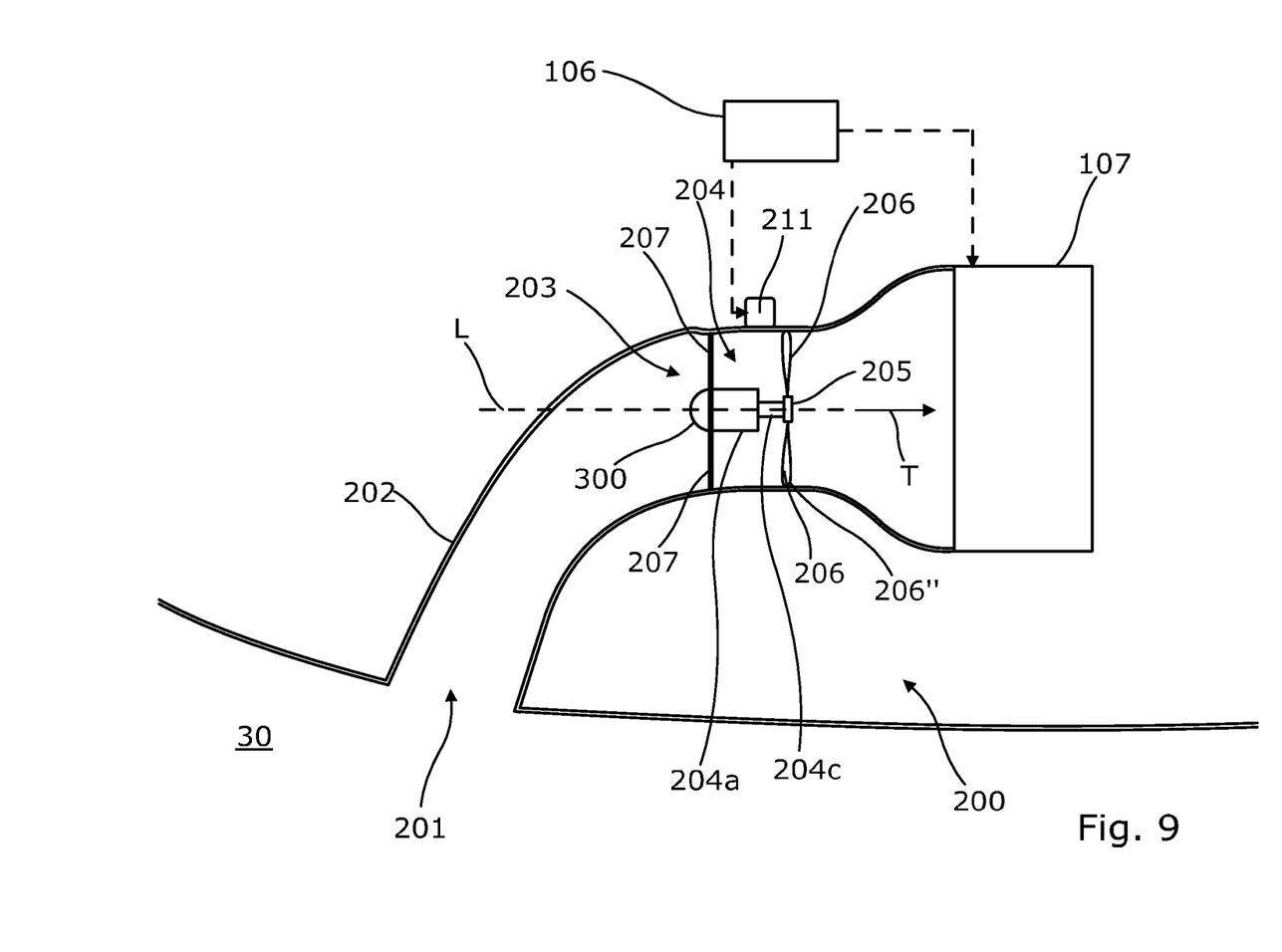
FIG. 9 is a view similar to FIG. 3 and depicts the system for the supply of air according to another embodiment of the disclosure herein.

Finally, so as not to slow down the flows of air as they flow inside the duct 202, an aerodynamic element 300 is attached to the element of the air flow valve 203 that is situated furthest upstream in the direction of flow of a flow of air passing through the duct T. Thus, as illustrated in FIGS. 4 to 8, a cone 300 is arranged at the extremity of the motor shaft 204c of the motor, with its base attached to the hub 205, or, as illustrated in FIG. 9, a cone 300 is arranged on the motor 204 with its base attached to the casing 204a of the motor.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising a turbomachine and a pylon, the turbomachine comprising an engine attached to the pylon, an annular interstream shroud surrounding the engine and an annular nacelle arranged coaxially around and radially towards the exterior in relation to the interstream shroud in such a way as to delimit, together with the latter, a stream of air, the turbomachine comprising a heat exchanger and a system for the supply of cold air, the system comprising an air inlet placed in the stream of air, an air duct connecting the air inlet fluidly to the exchanger, and an air flow valve with a variable flow rate placed inside the air duct, wherein the air flow valve comprises a hub, on which there are mounted at least three blades projecting radially from the hub in order to form a helix, each blade having a root mounted rotatably on the hub, the air flow valve in addition comprising an electric motor configured to drive the hub by a motor shaft, and structure for varying the pitch angle of the blades, the extremity of each blade being flush with a wall of the air duct, the air flow valve being controllable to adopt one of the following configurations:
a closed configuration, in which the pitch angle of the blades is 0° and in which the valve prevents the passage of the air through the duct;
an open configuration, in which the pitch angle of the blades is 90° and in which the valve completely opens the access to the air duct;
a charge configuration, in which the pitch angle of the blades lies in the range between 0° and 90°.

2. The propulsion assembly as claimed in claim 1, wherein, in the charge configuration, the pitch angle of the blades lies in the range between 35° and 50°.

3. The propulsion assembly as claimed in claim 1, wherein the structure for varying the pitch angle of the blades comprises a ring attached to a foot of each of the blades and movably mounted in translation on the motor shaft, an actuating lever, and a servomotor configured to cause the actuating lever to rotate.

4. The propulsion assembly as claimed in claim 3, wherein the actuating lever is rotatably mounted in an axis perpendicular to an axis of rotation of the motor shaft and is supported by two support arms that are spaced apart from one another and are each attached to the motor casing, the actuating lever comprising in addition two actuating arms that are spaced apart from one another, each of the actuating arms comprising at its free extremity a roller that is capable of rotation and is intended to roll in a throat made in the ring.

5. The propulsion assembly as claimed in claim 3, wherein, for each blade, the ring is attached to the foot of the blade via a lever having a pivoting linkage with a transmission rod parallel to the axis of rotation of the motor shaft, the lever being attached to the root of the blade.

6. The propulsion assembly as claimed in claim 1, wherein the hub is situated downstream in a direction of flow of a flow of air passing through the duct, while the motor is situated upstream in the direction of flow.

7. The propulsion assembly as claimed in claim 1, wherein the hub is situated upstream in a direction of flow of a flow of air passing through the duct, while the motor is situated downstream in the direction of flow.

8. The propulsion assembly as claimed in claim 1, wherein the exchanger is arranged inside the pylon, the air duct being arranged inside a space situated between the nacelle and the pylon.

* * * * *